(12) United States Patent
Maharaj

(10) Patent No.: US 10,441,065 B2
(45) Date of Patent: Oct. 15, 2019

(54) AWARENESS DEVICE FOR ATHLETES

(71) Applicant: DMYK INVENTIONS INC., Surrey (CA)

(72) Inventor: Damien Maharaj, Surrey (CA)

(73) Assignee: DMYK INVENTIONS INC. (CA)

( * ) Notice: Subject to any disclaimer, the term of this patent is extended or adjusted under 35 U.S.C. 154(b) by 0 days.

(21) Appl. No.: 16/007,381

(22) Filed: Jun. 13, 2018

(65) Prior Publication Data

US 2018/0289136 A1    Oct. 11, 2018

Related U.S. Application Data

(63) Continuation-in-part of application No. PCT/CA2017/000219, filed on Oct. 4, 2017.

(30) Foreign Application Priority Data

Oct. 19, 2016 (CA) ..................... 2946435
Nov. 23, 2016 (CA) ..................... 2949693

(51) Int. Cl.
| A45F 5/00 | (2006.01) |
| A45C 15/04 | (2006.01) |
| A45C 15/08 | (2006.01) |
| A45D 42/06 | (2006.01) |
| A44C 5/00 | (2006.01) |
| G02B 7/182 | (2006.01) |
| A61J 1/03 | (2006.01) |
| A45C 11/00 | (2006.01) |

(52) U.S. Cl.
CPC ............... *A45F 5/00* (2013.01); *A44C 5/003* (2013.01); *A45C 15/04* (2013.01); *A45C 15/08* (2013.01); *A45D 42/06* (2013.01); *A61J 1/03* (2013.01); *G02B 7/182* (2013.01); *A45C 2011/007* (2013.01); *A45F 2005/008* (2013.01)

(58) Field of Classification Search
CPC ...... A45F 5/00; A45F 2005/008; A44C 5/003; A45C 15/04; A45C 15/08; A45C 2011/007; A45D 42/06; A61J 1/03; G02B 7/182
USPC ........................................... 224/219
See application file for complete search history.

(56) References Cited

U.S. PATENT DOCUMENTS

| 2,749,634 A | 6/1956 | Billett |
| 3,717,403 A | 2/1973 | Messier |
| 4,054,375 A | 10/1977 | Ribeca |
| 4,489,853 A | 12/1984 | Korte |
| 4,490,012 A | 12/1984 | Magiske |
| 4,636,047 A | 1/1987 | Green |

(Continued)

FOREIGN PATENT DOCUMENTS

FR    2599521    12/1987

OTHER PUBLICATIONS

International Search Report dated Jan. 23, 2018, in International Patent Application No. PCT/CA2017000219, 4 Pages.

(Continued)

*Primary Examiner* — Peter N Helvey
(74) *Attorney, Agent, or Firm* — Baumgartner Patent Law; Marc Baumgartner

(57) ABSTRACT

A personal safety device for use with a wrist band for releasable attachment to a user's wrist, the safety device comprising: an upper convex mirrored surface; an identification (ID) holder slot, the ID holder slot extending from the front towards the back; an ID holder, the ID holder slidably, removably retained in the ID holder slot; and a medication holder.

10 Claims, 7 Drawing Sheets

(56) References Cited

U.S. PATENT DOCUMENTS

| | | |
|---|---|---|
| 5,361,169 A | 11/1994 | Deal |
| 7,063,427 B1 | 6/2006 | Cutler |
| 2005/0030836 A1 | 2/2005 | Burns |
| 2014/0226225 A1 | 8/2014 | Suess |

OTHER PUBLICATIONS

Written Opinion of the International Searching Authority dated Jan. 23, 2018, in International Patent Application No. PCT/CA2017000219, 6 Pages.

AWARENESS DEVICE FOR ATHLETES

CROSS REFERENCE TO RELATED APPLICATIONS

This present invention is a Continuation-in-Part of International Patent Application No. PCT/CA2017/000219, filed 4 Oct. 2017, which designated the U.S. and claims priority to Canadian Patent Application No. 2,946,435, filed 19 Oct. 2016, and to Canadian Patent Application No. 2,949,693 filed 23 Nov. 2016, all entitled AWARENESS DEVICE FOR ATHLETES, all of which are hereby incorporated in their entirety including all tables, figures, and claims.

FIELD

The present technology relates to an easy to wear device to be used by runners and walkers so that they can observe activity behind them while being aware of their own physical state. More specifically, the device is a watch, a rearview mirror and a storage compartment for identification and medication.

BACKGROUND

There are many situations where a user needs to know what is occurring behind their back. Runners, walkers and cyclist all need to look forward as much as possible. Looking over one's shoulder can lead to accidents including tripping and falling or running in to objects. However, there are many situations where one wants to be able to check over their shoulder.

Increasingly, active people are being encouraged to carry identification and any medication that they might need. This is especially important for people with allergies, heart conditions, and other conditions that require medication. Older runners are encouraged to carry aspirin.

Many athletes wear monitors that provide health information. Some include a watch and timer, but they are essentially dedicated devices with few additional capabilities.

FR 2,599,521 relates to a watch provided with a mirror mounted pivotally on a watch and covering the display. It is made up by incorporating and combining a moving or static reflecting element on a wrist watch or the like supplemented with a lens on the strap itself. It is intended to enable a person to survey his surroundings outside the visual field without having to turn around, without having to move his body or his head and this for preventive, utilitarian as well as recreational purposes. As shown, the mirror is concave and thus would not provide a good rear view. The mirror in the resulting device must be articulated in order that the user can read the time, or view any other metric on their watch or monitor. No further functionality is provided, hence a user will have to carry identification and/or medication elsewhere on them.

United States Patent Application 20050030836 discloses a watch that has a mirror dial plate assembly comprising a light valve layer, and a light reflective layer. The light valve is controlled by an electronic circuit for its on, off, and variable light transmission. The reflectivity of the mirror assembly is thus controlled. Dial marks are incorporated either on or in the light valve layer, or using a separation transparent layer. This would not provide a clear enough image for a user to see what is occurring behind them, nor could it be used to retrofit a watch or monitor to increase functionality.

U.S. Pat. No. 7,063,427 discloses a portable mirror device for hunters or other persons who need to extend their field of view to the side or rear without moving their head appreciably. The device is reversibly attached to a body-segment of the user and can either be raised to an active position or folded in a stored position against the body-segment. Also disclosed is an attachment-cuff for attaching the invention to the body-segment. The cuff comprises a rigid or semi-rigid inner member encased by a covering, which covering has two ends with closure means attached thereto for securing the cuff to the body-segment. This would not be suitable for a runner or other athlete to use while running, cycling or being involved in other athletic activities.

United States Patent Application 20140226225 discloses a rear view mirror device for use by the rider of a bicycle or other personal mobility vehicle comprising a convex reflective mirror integrated with a base component and held in place over the optimum sweet spot triangulated area between the index finger, thumb and wrist of a bare hand or a gloved hand of any size by means of a harness system comprising an elastic cord threaded through holes in the base component to form loops for insertion of the wrist, index finger and thumb of the hand and secured on the back of the hand through cord pulls at the ends of the elastic cord. The device provides a near vibration-less, clear, sharp and accurate rear viewing, and effortless, infinite maneuverability into the most optimal position to focus through an individual's own unique eyesight, leading to less eye strain. This device interferes with a user's hand, and has only one function. It would not be suitable for use with a watch or monitor.

U.S. Pat. No. 3,717,403 discloses a rear-viewing mirror that is adapted to be worn by the viewer. The mirror includes a base; a frame mounted on the base; and a mirror mounted in the frame. Apparel means, for example, a glove, or a mitt, or a band, or an elastic band, is secured to the base and is adapted to be worn by the user. This wearing is carried out in such a manner that the mirror is visible to the wearer. This device has only one function and would not be suitable for a runner.

U.S. Pat. No. 4,054,375 discloses a rearview cycling mirror comprising a case housing a mirror adapted to be strapped to the wrist of a cyclist or attached via a clip to the bicycle. The mirror is mounted on the inside face of the case cover which is hinged to the base of the case by a universal ball joint. This joint provides maximum adjustability to the cyclist. The strap or clip is inserted through a slot in a dropped portion of the base. This device has only one function and would not be suitable for a runner.

U.S. Pat. No. 4,490,012 discloses a safety rear view mirror device that has a detachable mounting base part for removably securing it alternately on the brim or peak portion of a cap or the crown portion of a hat or other type of head covering. The mounting base part is bifurcated to alternately fit over and to be securely clamped by a mounting screw to the peak portion of a cap or alternatively, to rest against and to be clamped on the crown portion of a hat by a through-extending mounting screw. A flexible and ductile connector cable is endwise slidably, removably mounted at one end within a collar portion of the base part and, at its other end, is adapted to be securely and detachably mounting by a spring clip to a back mounting for a back-viewing mirror. The cable is constructed for easy finger-grip bending to move the mirror into the best rear viewing position, with full assurance that the cable will stay in its selected bent positioning. The cable has a metal core cast within and enclosed by a hollow insulating sheath. Head or hat mounted mirrors have been found to provide a poor image and are difficult to use as they obstruct the user's vision, if positioned to provide a rear view.

U.S. Pat. No. 5,361,169 discloses a mirror which is attached to an underwater diver's wrist or arm. By placing the mirror in front of his face mask and controlling the line of sight reflected by the mirror, the diver can inspect equipment on his body or easily access equipment with the hand not wearing the mirror. In addition, the diver's peripheral vision is improved so he or she can see objects, fish or a diving partner located behind them. The mirror is attached to the diver's wrist or arm by a wrist strap made of water resistant material such as nylon or rubber. Alternate embodiments include a pouch containing the mirror on a flexible strap and a diver's handheld console with a hinged plate containing the mirror. This device is specific to diving and would not be suitable for runners or other athletes to use to check what is happening behind them. It is limited in functionality.

In a related technology, U.S. Pat. No. 4,636,047 discloses a high quality mirror readily at hand for the emergency use of a contact lens wearer, an accessory mirror comprising a thin wafer having a mirrored outer surface is affixed to the back of a wrist watch. The presently preferred embodiment of the invention comprises a steel wafer shaped approximately to conform with the shape of the watch back. The steel wafer has a first surface which is mirror finished and chromium plated and a second surface coated with an adhesive layer which is itself overlayed by a paper wafer. Thus, the paper wafer is removable to permit affixing the steel wafer to the wrist watch back. A process for preparing the preferred embodiment of the product is disclosed. In addition, variants utilizing a plastic film sold under the trademark "Mylar®" and coated with metal and incorporating a protective cover for the mirror surface are also disclosed. This would not be suitable for an athlete to use for viewing behind them, nor does it provide a storage area.

What is needed is a device that is multipurpose to allow an active person to easily see behind themselves on an as need basis, that does not obstruct their forward vision. The device would preferably be for locating on a user's wrist and would be releasably retained on a wrist band. The device would include a convex mirror on an upper surface. The device would further includes a clearly marked identification holder under the mirror and a capsule beside the mirror for medication and the like. The device would be small and unobtrusive. The wrist band would also retain a monitor such as a heart rate monitor, a Global Positioning System (GPS), a fitness tracker and the like, or watch, also mounted on the strap.

SUMMARY

The present technology is a safety device for active people that allows them to see behind themselves on an as need basis, that does not obstruct their forward vision. The device is for locating on a user's wrist and is releasably retained on a wrist band. The device includes a convex mirror on an upper surface. The device further includes a clearly marked identification holder under the mirror and a capsule beside the mirror for medication and the like. The device is small and unobtrusive. The wrist band may also retain a monitor such as a heart rate monitor, a Global Positioning System (GPS), a fitness tracker and the like, or watch, also mounted on the strap.

In one embodiment, a personal safety device for use with a wrist band for releasable attachment to a user's wrist is provided, the safety device comprising: a body, the body including a front, a back, which is opposite the front, a bottom, a top which is opposite the bottom, a pair of sides extending between the bottom and the top, each including a step proximate the front, a shelf between the front and the steps, a lip extending inward from the pair of sides, the back and the step; an upper convex mirrored surface, the mirrored surface retained by the lip; the body defining an identification (ID) holder slot, the ID holder slot extending from the shelf towards the back; an ID holder, the ID holder slidably, removably retained in the ID holder slot and including a tab, the tab flush with the top and the front; a first slot in the body below the tab; a medication capsule attached to the body proximate the back, the medication capsule including capsule sidewalls; a lid, the lid including lid sidewalls; a living hinge which retains the lid on the medication capsule; a second slot in the medication capsule; and a pair of bands, one retained in the first slot and the other retained in the second slot to define a pair of loops for releasably retaining a wrist band.

The personal safety device may further comprise groove and a flexible section between the medication capsule and the body.

In the personal safety device, the body, the medication capsule, the lid and the living hinge may be a unit body.

In the personal safety device, the tab may include a sign.

In the personal safety device, an inner top surface of the lid of the medication capsule may include baffles.

In the personal safety device, the lid sidewalls may releasably mate with the capsule sidewalls.

In the personal safety device, the ID holder may include a lower section, the lower section hingedly attached to the tab.

The personal safety may further comprise ID retained between the lower section and the tab.

In another embodiment, an awareness combination for releasable attachment to a user's wrist is provided, the combination comprising: i) a personal safety device, the safety device comprising: a body, the body including a front, a back, which is opposite the front, a bottom, a top which is opposite the bottom, a pair of sides extending between the bottom and the top, each including a step proximate the front, a shelf between the front and the steps, a lip extending inward from the pair of sides, the back and the step; an upper convex mirrored surface, the mirrored surface retained by the lip; the body defining an identification (ID) holder slot, the ID holder slot extending from the shelf towards the back; an ID holder, the ID holder slidably, removably retained in the ID holder slot and including a tab, the tab flush with the top and the front; a first slot in the body below the tab; a medication capsule attached to the body proximate the back, the medication capsule including capsule sidewalls; a lid, the lid including lid sidewalls; a living hinge which retains the lid on the medication capsule; a second slot in the medication capsule; and a pair of bands, one retained in the first slot and the other retained in the second slot to define a pair of loops for releasably retaining a wrist band; ii) a monitor, a watch or a combination watch-monitor; and iii) the wrist strap, the wrist strap retaining the safety device and the monitor, the mirror and the monitor mounted a long a length of the wrist strap.

In the awareness combination, the personal safety device may be rectangular and has a longitudinal axis coaxial with the length of the wrist strap.

In the awareness combination, the body, the medication capsule, the lid and the living hinge may be a unit body.

In the awareness combination, the tab may include a sign.

In the awareness combination, the monitor may be selected from the group consisting of a heart rate monitor, a Global Navigation Satellite System (GNSS), and a fitness tracker.

In the awareness combination, the safety device may further comprise a groove and a flexible section between the medication capsule and the body.

In the awareness combination, an inner top surface of the lid of the medication capsule may include baffles.

In the awareness combination, the ID holder may include a lower section, the lower section hingedly attached to the tab.

The awareness combination may further comprise ID retained between the lower section and the tab.

In another embodiment, a method of improving personal safety of a user is provided, the method comprising the user attaching a personal safety device on their wrist with a wrist band, the safety device comprising: a body, the body including a front, a back, which is opposite the front, a bottom, a top which is opposite the bottom, a pair of sides extending between the bottom and the top, each including a step proximate the front, a shelf between the front and the steps, a lip extending inward from the pair of sides, the back and the step; an upper convex mirrored surface, the mirrored surface retained by the lip; the body defining an identification (ID) holder slot, the ID holder slot extending from the shelf towards the back; an ID holder, the ID holder slidably, removably retained in the ID holder slot and including a tab, the tab flush with the top and the front; a first slot in the body below the tab; a medication capsule attached to the body proximate the back, the medication capsule including capsule sidewalls; a lid, the lid including lid sidewalls; a living hinge which retains the lid on the medication capsule; a second slot in the medication capsule; and a pair of bands, one retained in the first slot and the other retained in the second slot to define a pair of loops for releasably retaining a wrist band, and the user lifting the user's wrist retaining the personal safety device to a height to permit viewing of an area behind the user.

The method may further comprise the user storing a piece of personal identification in the ID holder.

FIGURES

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Figure 1:
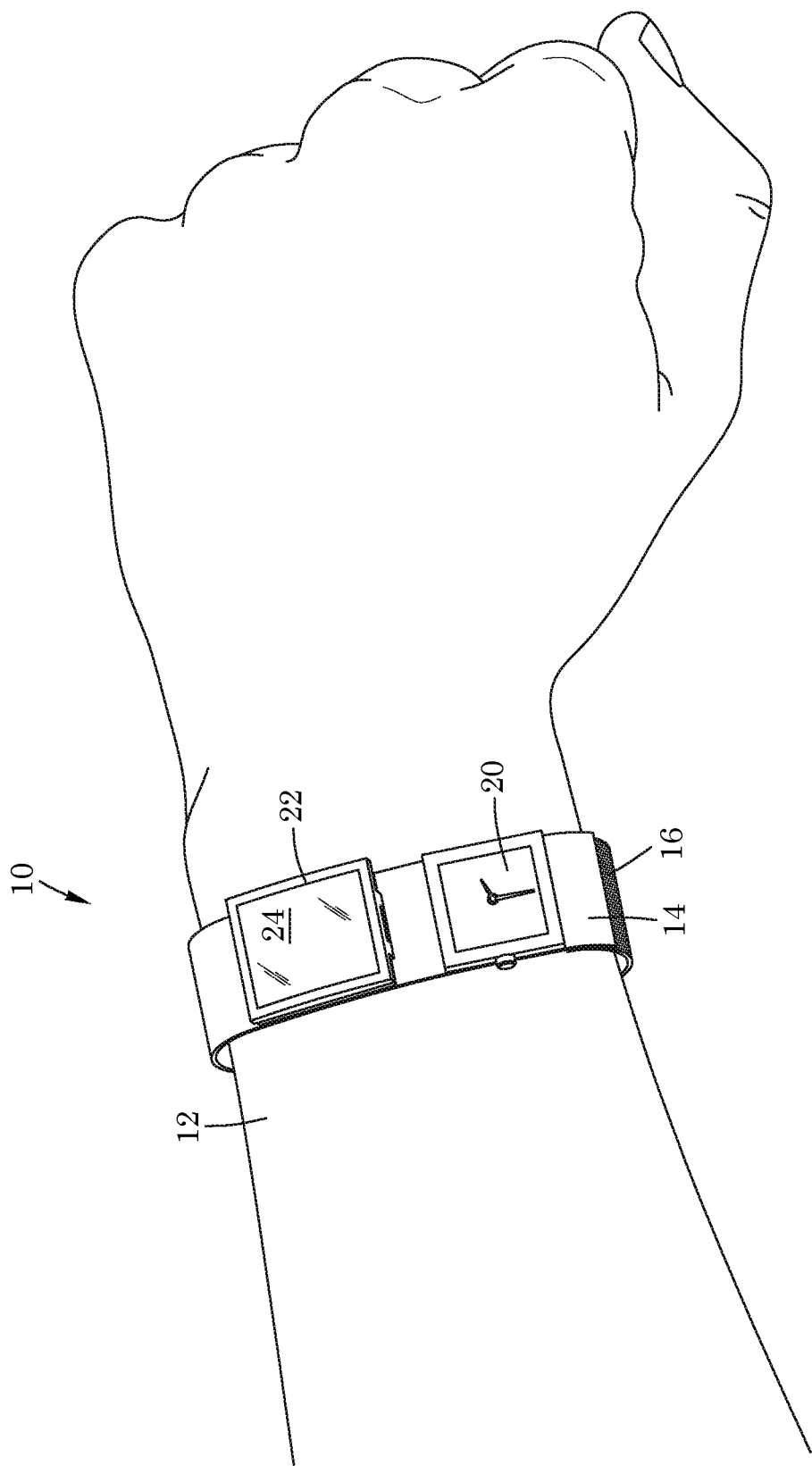
FIG. 1 is a plan view of the multipurpose combination of the present technology on a user's wrist.

A multipurpose awareness combination, generally referred to as 10 is shown in FIG. 1, on the wrist 12 of a user. The user is typically an athlete but need not be. The combination 10 has a wrist band 14 that releasably holds the combination 10 around the user's wrist 12. It has a closure 16 which may have a buckle closure or a hook and loop type closure. A monitor, watch or combination watch-monitor 20 is retained on the wrist band 14 and proximate the monitor, watch or combination watch-monitor 20 is a safety device 22. The safety device 22 has an upper mirrored surface 24, which is convex.

Figure 2:
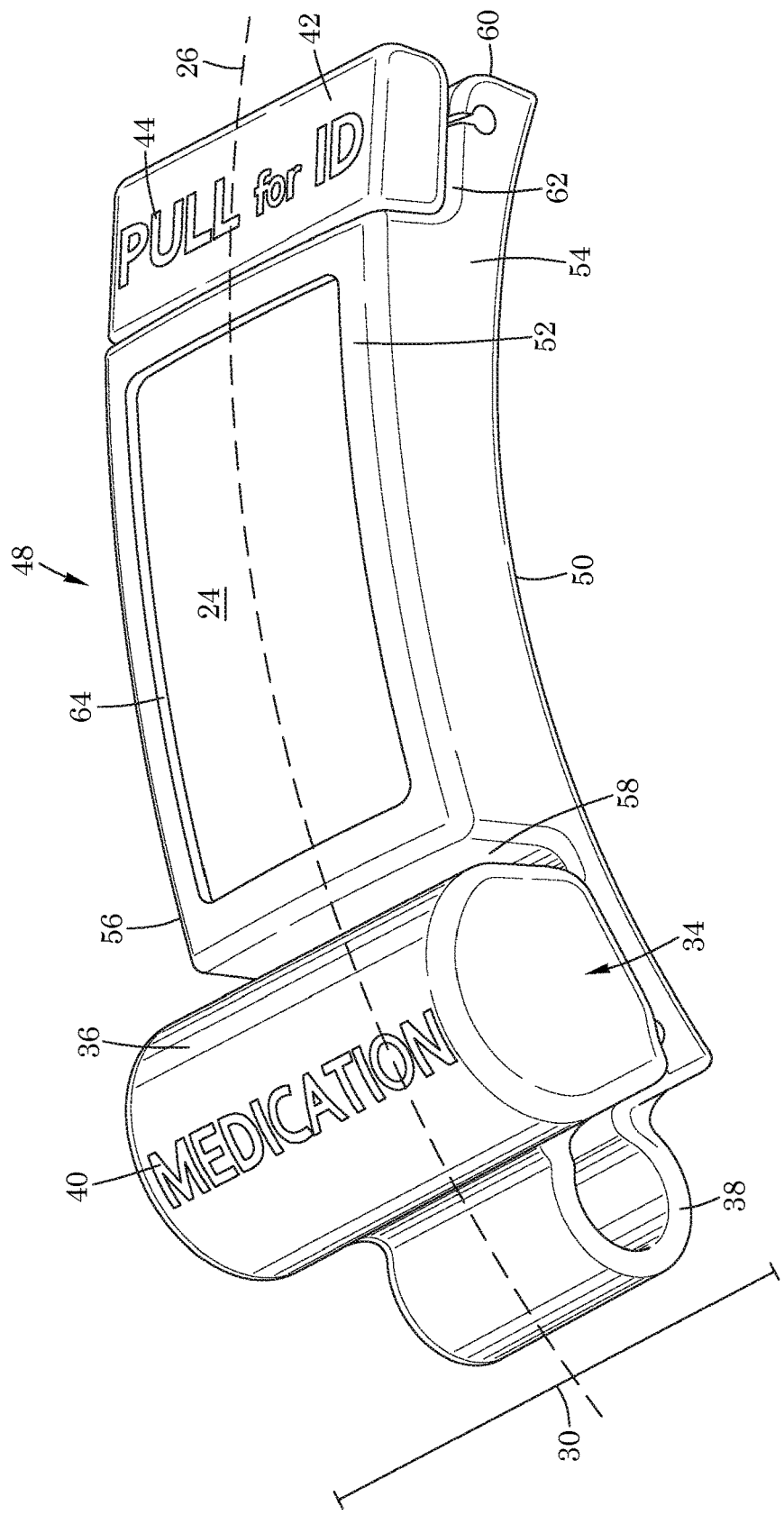
FIG. 2 is a perspective view of the safety device of the present technology.

As shown in FIG. 2, the safety device 22 is rectangular and has a longitudinal axis 26 coaxial with the length of the wrist band 14. The safety device 22 has a width 30 that is not significantly wider than the width of the band 14, in other words, no wider than about the width of the monitor 20. The safety device 22 is curved to fit the wrist of the user. It has a medication holder, generally referred to as 34 that includes a lid 36. A living hinge 38 attaches the lid 36 to a capsule 75 (see FIG. 3). The medication holder 34 has a sign 40 stating "MEDICATION". At the other end is an ID holder tab 42 which has a sign 44 on it stating "PULL for ID".

The safety device 22 has a body generally referred to as 48, which includes a bottom 50, a top 52, a first side 54, a second side 56, which is parallel and opposite the first side 54, a back 58 and a front 60. The body 48 and the medication holder 34 are preferably injection molded and are made of a flexible plastic polymer.

The sides 54, 56 define a step 62 proximate the front 60. The sides 54, 56, the back 58 and the front 60 include an inward facing lip 64. The lip 64 retains the mirrored surface 24.

Figure 3:
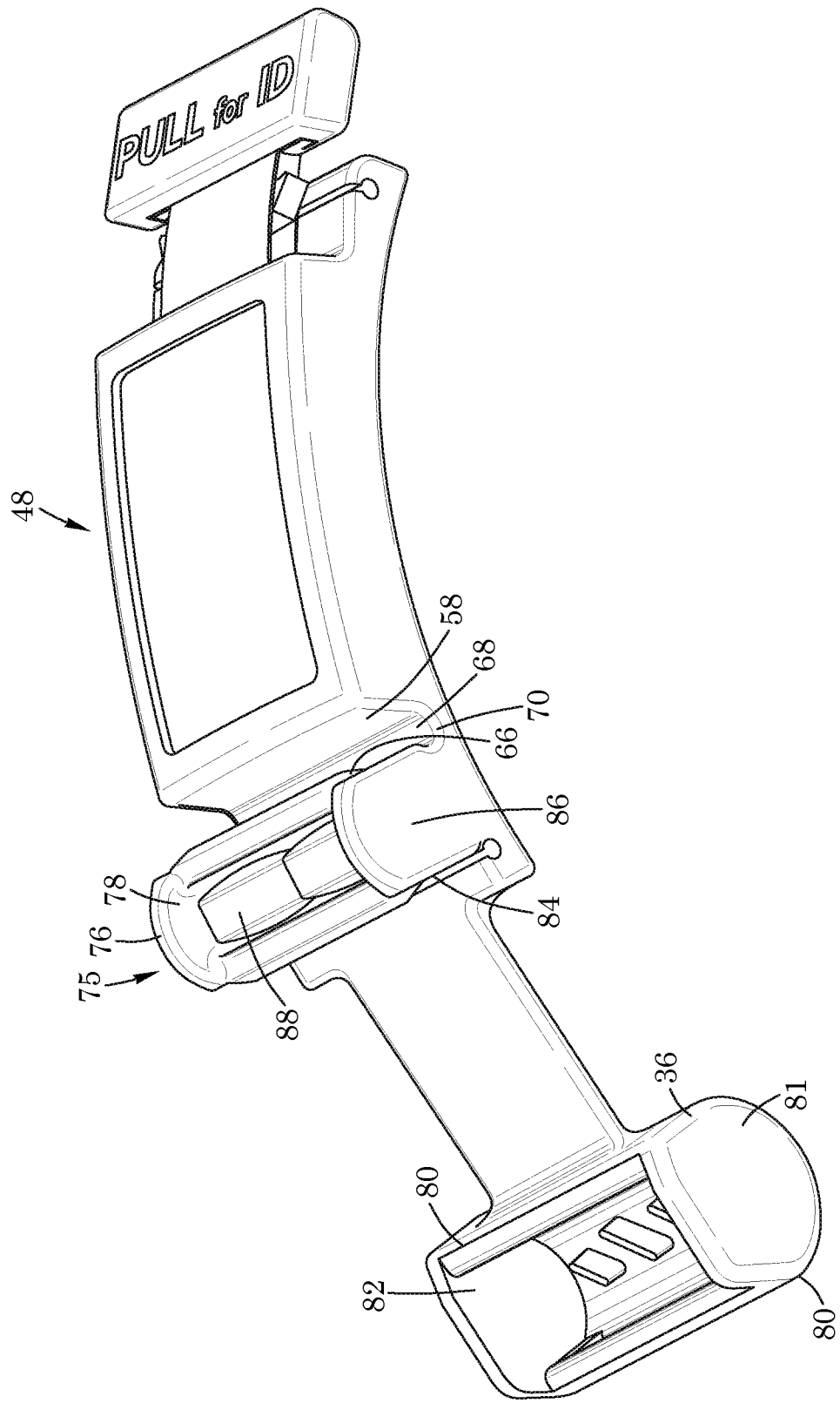
FIG. 3 is a perspective view of the safety device of FIG. 2 with the medication holder and ID holder open.

As shown in FIG. 3, the back 58 and the medication holder front sidewall 66 define a groove 68. This groove 68 allows for flexing of the resultant thin flexible section 70 between the body 48 and the medication holder 34, allowing for the body 48 and the medication holder 34 to approach one another in the case of a user having a larger than normal wrist and to move away from one another in the case of a user with a smaller than normal wrist. In other words, the thin, flexible section 70 allows for the curvature of the safety device 22 to increase or decrease as needed.

Figure 4:
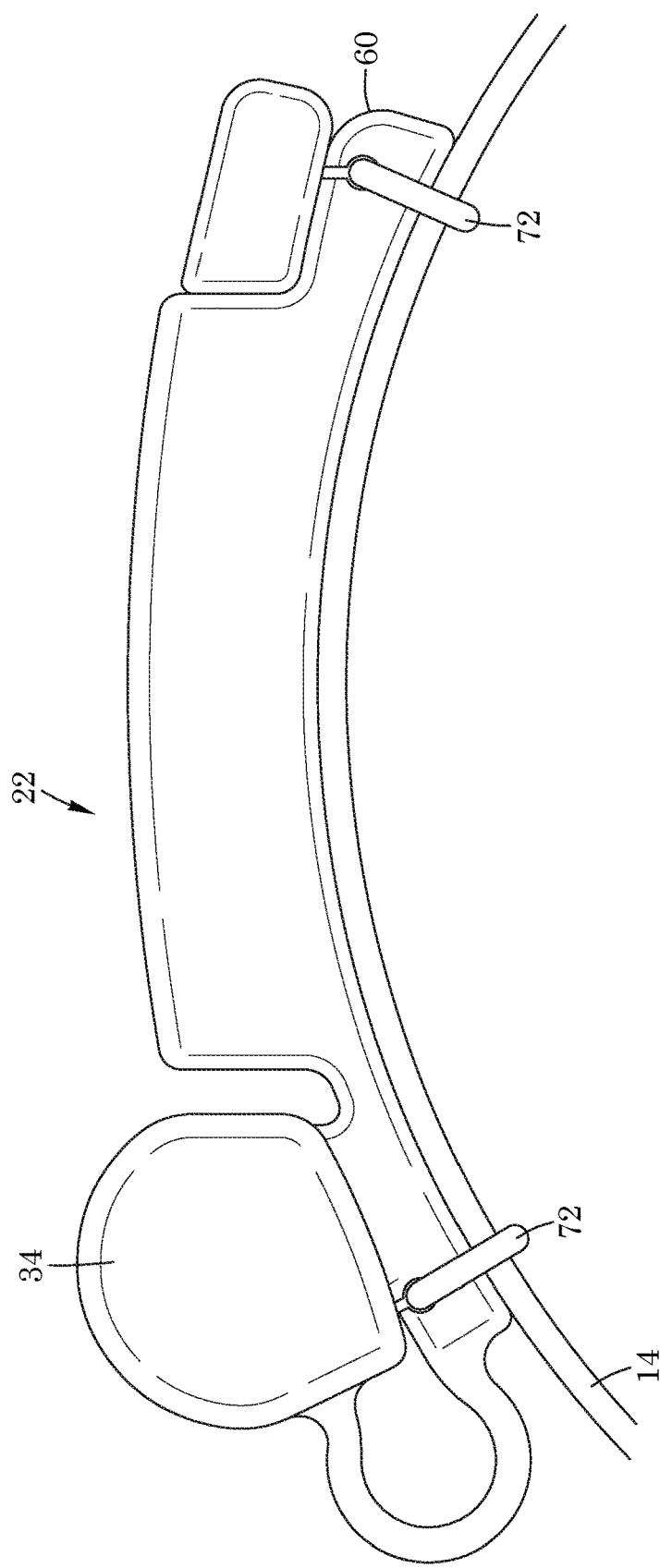
FIG. 4 is a sectional view of the safety device of FIG. 2 on a wrist strap.

As shown in FIG. 4, the safety device 22 is releasably retained on the wrist band 14 with two bands 72. The bands 72 are one piece and are stretchable. This allows for different wrist band widths and thicknesses to be accommodated. The bands 72 are either loops or form loops with the safety device 22 and are located proximate the medication holder 34 and the front 60. The loops 72 are sized to accept a range of sizes of wrist band 14 and as noted, are stretchable. One specific example is a Fitbit® Surge® which is 1.34" (34.3 mm) wide, the Fitbit Charge® which is 0.8" (20.3 mm) wide, the Fitbit Alta® which is 0.6" (15.2 mm) wide, the Fitbit Blaze® which is 0.87" (22.1 mm), the Fitbit Flex® which is 0.5" (12.7 mm) wide and the Fitbit One® which is 0.76" (19.3 mm) wide. The safety device therefore need not be specific to a given product.

Returning to FIG. 3, the capsule, generally referred to as 75 is rectangular with rounded edges 76 and defines an interior 78. The lid 36 has sidewalls 80 and ends 81 that defines an interior space 82. The frame 80 is sized to press fit over the back sidewall 84, front sidewall 66 (referred to as the sidewalls) and ends 86 of the capsule 75. With the frame 80 in place, the capsule interior space 78 is sized to accept two round pills 88 or an elongate pill.

Figure 5:
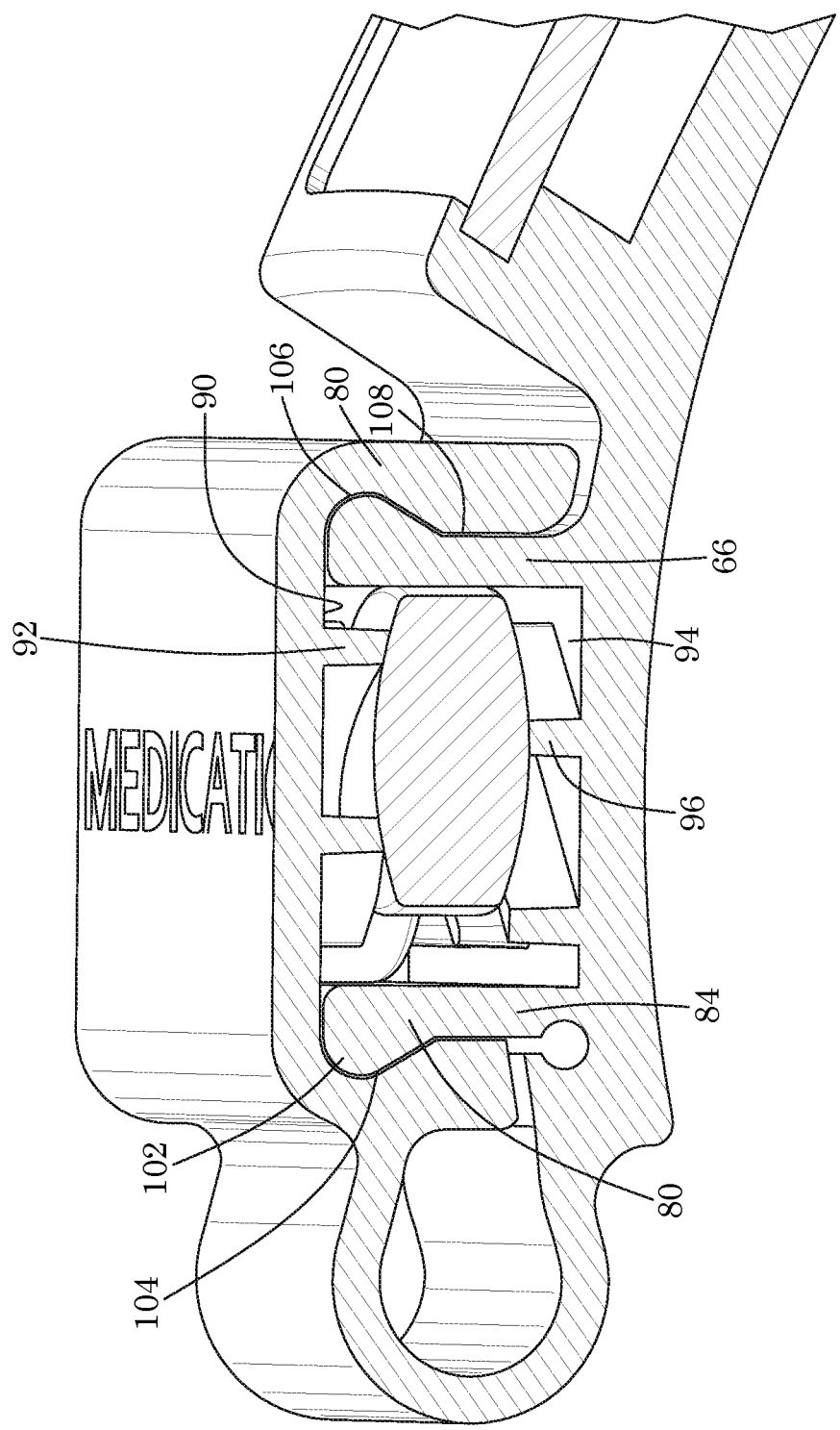
FIG. 5 is a sectional view of the medication holder of the safety device of FIG. 2.

As shown in FIG. 5, the top inner surface 90 of the lid 36 has a series of baffles 92. Similarly, the bottom inner surface 94 of the capsule 75 have a series of baffles 96. These are to retain the pills 88 and to reduce movement of the pills 88 in the capsule interior space 78. The capsule front sidewall 66 and back 84 releasably mate with the frame 80 of the lid 36. A bulge 102 on the outer side 104 of the frame 80 nest in an indent 106 on the inner surface 108 of the lid front sidewall 66 and back 84. This creates a seal that reduces or eliminates water ingress.

Figure 6:
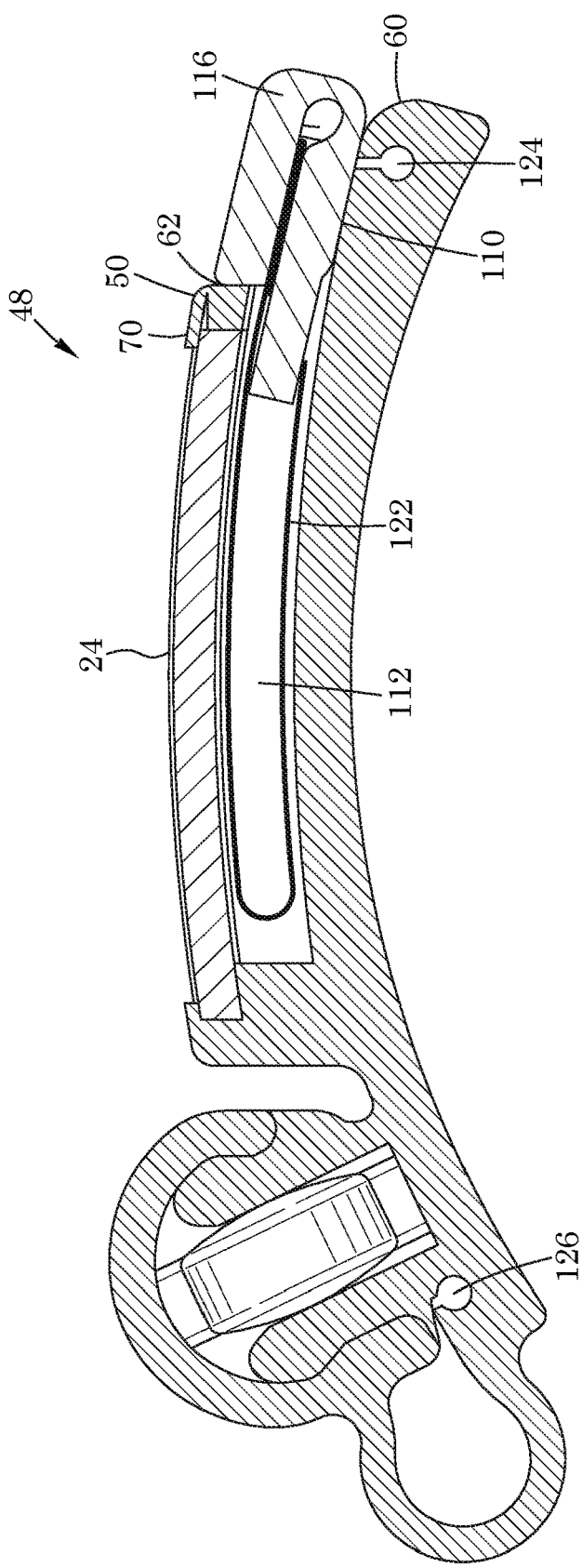
FIG. 6 is a sectional view of the safety device of FIG. 2.

As shown in FIG. 6, the body 48 has a shelf 110 between the front 60 and the steps 62. An ID slot 112 extends from the shelf into the body 48. Only the front of the ID slot 112, which is at the step 62, is open to the ambient. It can also be seen that the mirrored surface 24 is held in place by the lip 70. The ID holder tab 42 is sized to be flush with the top 52 and, when abutted to the steps 62, is flush with the front 60. The ID holder 116 retains a folded resilient sheet 122 upon which a user can write their name and name and phone number of a person to contact. The ID holder 116 and the resilient sheet 122 are releasably retained in the ID slot 112. A front slot 124 and a back slot 126 traverse the width of the safety device 22 for retaining the elastic bands 72. The slots 124, 126 are hidden when the lid 36 is closed and the tab 42 abuts the step 62.

Figure 7:
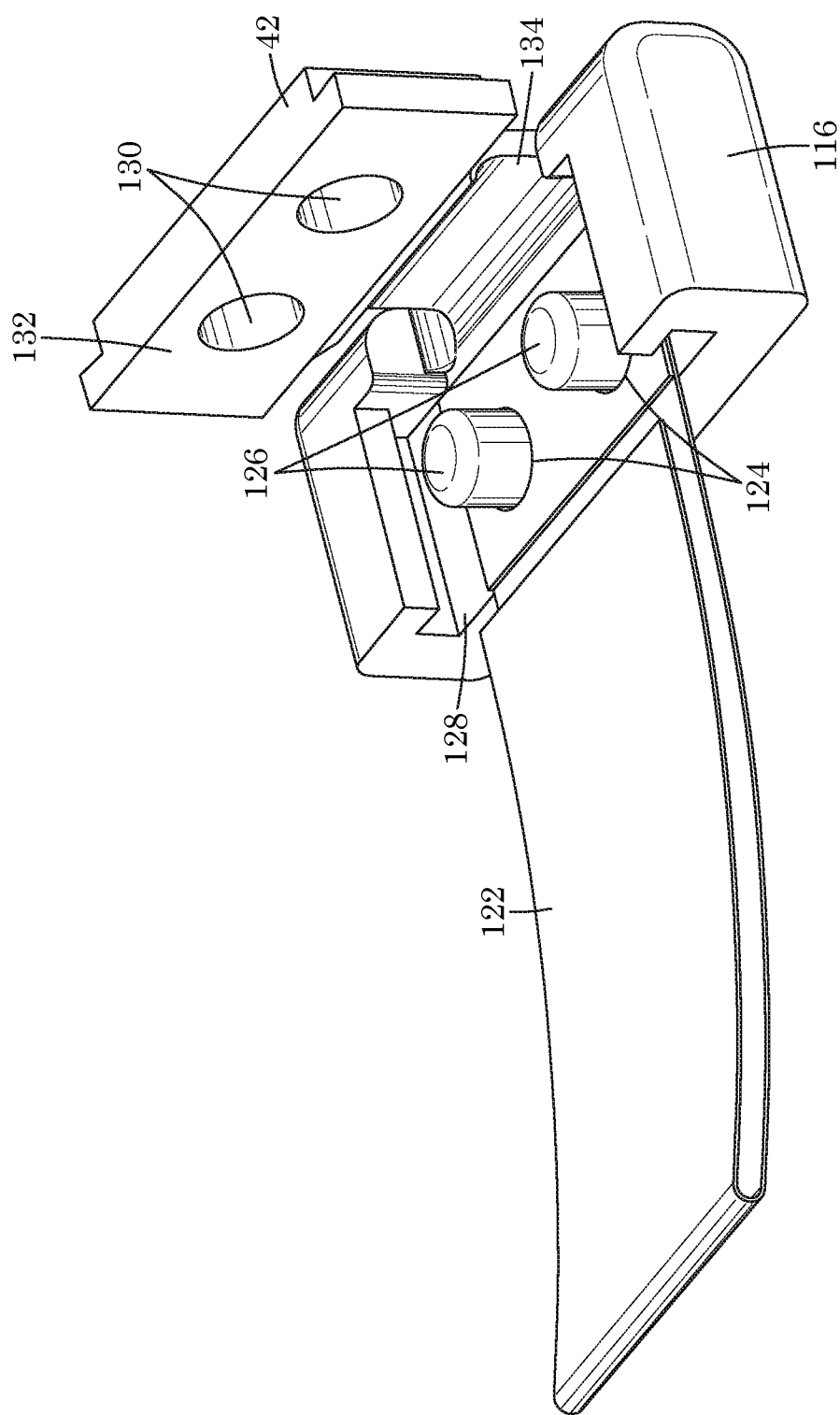
FIG. 7 is a perspective view of the ID holder of the safety device of FIG. 2.

The ID holder 116 and resilient sheet 122 are shown in FIG. 7. The resilient sheet 122 has two holes 124 punched through it. Two pegs 126 which are in the lower section 128 of the ID holder 116 extend through the holes 124 and mate with two depressions 130 in the underside 132 of the ID holder tab 42. A living hinge 134 attaches the lower section 128 to the ID holder tab 42.

With regard to a large sized wristband, the device bottom 50 preferably has a curvature with a radius of about 45 to about 47 mm. The total length of the device would preferably be about 55 mm and the width of the device is preferably about 26 mm. The radius of curvature of the mirror is about 890 mm and 1800 mm.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed. For example, the frame and the capsule may be provided as a unit body or may be two parts that are attached to one another.

The invention claimed is:

1. A personal safety device for use with a wrist band for releasable attachment to a user's wrist, the safety device comprising: a body, the body including a front, a back, which is opposite the front, a bottom, a top which is opposite the bottom, a pair of sides extending between the bottom and the top, each including a step proximate the front, a shelf between the front and the steps, a lip extending inward from the pair of sides, the back and the step; an upper convex mirrored surface, the mirrored surface retained by the lip; the body defining an identification (ID) holder slot, the ID holder slot extending from the shelf towards the back; an ID holder, the ID holder slidably, removably retained in the ID holder slot and including a tab, the tab flush with the top and the front; a first slot in the body below the tab; a medication capsule attached to the body proximate the back, the medication capsule including capsule sidewalls; a lid, the lid including lid sidewalls; a living hinge which retains the lid on the medication capsule; a second slot in the medication capsule; and a pair of bands, one retained in the first slot and the other retained in the second slot to define a pair of loops for releasably retaining a wrist band.

2. The personal safety device of claim 1, further comprising groove and a flexible section between the medication capsule and the body.

3. The personal safety device of claim 2, wherein the body, the medication capsule, the lid and the living hinge are a unit body.

4. The personal safety device of claim 3, wherein the tab includes a sign.

5. The personal safety device of claim 4, wherein an inner top surface of the lid of the medication capsule includes baffles.

6. The personal safety device of claim 5, wherein the lid sidewalls releasably mate with the capsule sidewalls.

7. The personal safety device of claim 6, wherein the ID holder includes a lower section, the lower section hingedly attached to the tab.

8. The personal safety device of claim 7, further comprising ID retained between the lower section and the tab.

9. An awareness combination for releasable attachment to a user's wrist, the combination comprising: i) a personal safety device, the safety device comprising: a body, the body including a front, a back, which is opposite the front, a bottom, a top which is opposite the bottom, a pair of sides extending between the bottom and the top, each including a step proximate the front, a shelf between the front and the steps, a lip extending inward from the pair of sides, the back and the step; an upper convex mirrored surface, the mirrored surface retained by the lip; the body defining an identification (ID) holder slot, the ID holder slot extending from the shelf towards the back; an ID holder, the ID holder slidably, removably retained in the ID holder slot and including a tab, the tab flush with the top and the front; a first slot in the body below the tab; a medication capsule attached to the body proximate the back, the medication capsule including capsule sidewalls; a lid, the lid including lid sidewalls; a living hinge which retains the lid on the medication capsule; a second slot in the medication capsule; and a pair of bands, one retained in the first slot and the other retained in the second slot to define a pair of loops for releasably retaining a wrist band; ii) a monitor, a watch or a combination watch-monitor; and iii) the wrist strap, the wrist strap retaining the safety device and the monitor, the mirror and the monitor mounted a long a length of the wrist strap.

10. The awareness combination of claim 9, wherein the personal safety device is rectangular and has a longitudinal axis coaxial with the length of the wrist strap.

* * * * *